US008666641B2

(12) United States Patent
Rollinger et al.

(10) Patent No.: US 8,666,641 B2
(45) Date of Patent: *Mar. 4, 2014

(54) ENGINE CONTROL WITH VALVE OPERATION MONITORING USING CAMSHAFT POSITION SENSING

(75) Inventors: John Eric Rollinger, Sterling Heights, MI (US); Robert Andrew Wade, Dearborn, MI (US); Jeffrey Allen Doering, Canton, MI (US); Steven Joseph Szwabowski, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 52 days.

This patent is subject to a terminal disclaimer.

(21) Appl. No.: 13/560,253

(22) Filed: Jul. 27, 2012

(65) Prior Publication Data

US 2012/0296550 A1    Nov. 22, 2012

Related U.S. Application Data

(63) Continuation of application No. 12/877,309, filed on Sep. 8, 2010, now Pat. No. 8,249,796.

(51) Int. Cl.
| *G06F 19/00* | (2011.01) |
| *G06G 7/70* | (2006.01) |
| *B60T 7/12* | (2006.01) |
| *G05D 1/00* | (2006.01) |
| *G06F 7/00* | (2006.01) |
| *G06F 17/00* | (2006.01) |
| *F02D 13/06* | (2006.01) |
| *F02D 17/02* | (2006.01) |
| *F02B 77/08* | (2006.01) |
| *F02D 17/04* | (2006.01) |
| *F02M 63/02* | (2006.01) |
| *F02D 7/00* | (2006.01) |

(52) U.S. Cl.
USPC ... 701/114; 701/86; 123/198 DB; 123/198 F; 123/481

(58) Field of Classification Search
USPC ....... 123/90.11, 90.15–90.18, 198 DB, 198 F, 123/325, 332, 406.62, 406.63, 481, 198 D; 701/86, 102, 103, 112, 114; 73/114.79; 702/182, 183, 185, 189, 190
See application file for complete search history.

(56) References Cited

U.S. PATENT DOCUMENTS

| 5,303,158 | A | 4/1994 | Kuroda | |
| 5,345,817 | A * | 9/1994 | Grenn et al. | 73/114.04 |
| 5,504,682 | A | 4/1996 | Shiraishi et al. | |
| 5,715,779 | A * | 2/1998 | Kato et al. | 123/90.15 |
| 6,009,857 | A | 1/2000 | Hasler et al. | |
| 6,609,498 | B2 | 8/2003 | Matthews et al. | |
| 6,886,525 | B1 * | 5/2005 | Hayes et al. | 123/198 F |
| 2004/0016292 | A1 * | 1/2004 | Kawamura et al. | 73/118.1 |
| 2004/0237916 | A1 * | 12/2004 | Takahashi | 123/90.15 |
| 2006/0224297 | A1 | 10/2006 | Kabele | |
| 2008/0294326 | A1 * | 11/2008 | Andren | 701/103 |

FOREIGN PATENT DOCUMENTS

| DE | 19963457 A1 | 7/2001 |
| DE | 19963638 A1 | 7/2001 |
| DE | 102004004327 A1 | 9/2004 |
| DE | 102004029059 A1 | 1/2005 |
| DE | 102006050597 A1 | 7/2007 |

* cited by examiner

OTHER PUBLICATIONS

German Office Action dated Jan. 10, 2013, for corresponding German Application No. 10 2011 081 782.4.

*Primary Examiner* — Stephen K Cronin
*Assistant Examiner* — Sizo Vilakazi
(74) *Attorney, Agent, or Firm* — Julia Voutyras; Brooks Kushman P.C.

(57) ABSTRACT

A system or method for controlling a multiple cylinder internal combustion engine operable in a reduced displacement mode with at least one valve or cylinder selectively deactivated include monitoring valve operation by analyzing camshaft position to detect valve operation inconsistent with a current cylinder state (activated or deactivated) and controlling the engine in response to detecting the inconsistent operation. The camshaft position may be used to produce a surrogate signal indicative of intake/exhaust valve lift generated using camshaft sensor tooth deviation relative to an expected or reference tooth position for a corresponding crankshaft position and compared to a corresponding threshold. The surrogate signal indicative of valve lift may also be generated by pattern matching or correlation of one or more reference tooth position patterns to a measured or inferred tooth position pattern.

17 Claims, 9 Drawing Sheets

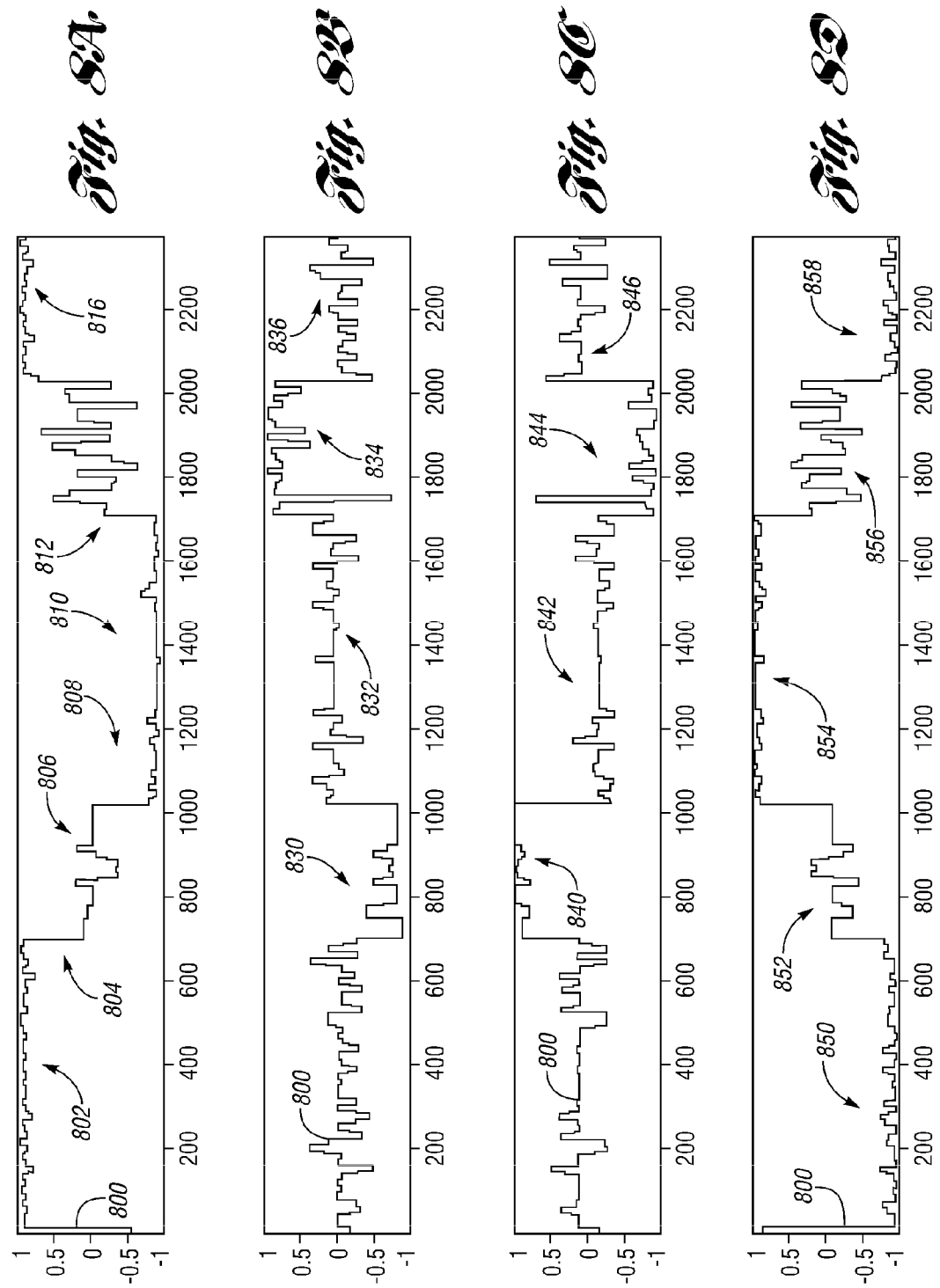

ENGINE CONTROL WITH VALVE
OPERATION MONITORING USING
CAMSHAFT POSITION SENSING

CROSS-REFERENCE TO RELATED APPLICATION

This application is a continuation of U.S. patent application Ser. No. 12/877,309 filed Sep. 8, 2010, now U.S. Pat. No. 8,249,796, the disclosure of which is incorporated in its entirety by reference herein.

BACKGROUND

1. Technical Field

Systems and methods for monitoring valve operation in an internal combustion engine using camshaft position sensing.

2. Background Art

Fuel economy for a multi-cylinder internal combustion engine can be improved by deactivating some of the engine cylinders under certain operating conditions. Reducing the number of operating cylinders reduces the effective displacement of the engine when operating in a reduced displacement mode such that it is sometimes referred to as a variable displacement engine. Depending upon the particular configuration of the variable displacement engine, one or more cylinders may be selectively deactivated to improve fuel economy under light-to-moderate load conditions, for example. In some engine configurations, a group of cylinders, which may be an entire bank of cylinders, is selectively deactivated. Cylinder deactivation may include deactivation of intake valves, exhaust valves, or both depending upon the particular application and engine technology. Various techniques have been developed for activating and deactivating intake and/or exhaust valves that rely on mechanical, hydraulic, electric/electronic or combination devices to implement valve deactivation in response to a command signal from an engine controller.

Under some conditions deactivated valves may continue to operate (open or lift) and/or activated valves may not open when commanded. Such conditions may result in degraded drivability, increased NVH (noise, vibration, harshness), reduced fuel economy, or component degradation, for example. As such, a number of strategies have been developed for monitoring valve operation. For example, one strategy analyzes the period between intake pressure pulses measured by a manifold absolute pressure (MAP) sensor, while another strategy analyzes a knock sensor signal.

SUMMARY

A system or method for controlling a multiple cylinder internal combustion engine operable in a reduced displacement mode with at least one valve or cylinder selectively deactivated include monitoring valve operation by analyzing camshaft position to detect valve operation inconsistent with a current cylinder state and controlling the engine in response to detecting the inconsistent operation. In one embodiment, a camshaft sensor signal is processed to detect valve operation inconsistent with a current valve/cylinder state, e.g. activated or deactivated. The camshaft position may be used to produce a surrogate signal indicative of intake/exhaust valve lift. The surrogate signal may be generated using camshaft sensor tooth deviation relative to an expected or reference tooth position for a corresponding crankshaft position and compared to a corresponding threshold to detect intake/exhaust valve lift. In another embodiment, the surrogate signal indicative of valve lift is generated by pattern matching of one or more reference tooth position patterns to a measured or inferred tooth position pattern. In this embodiment the surrogate signal represents a correlation, probability, or degree of match to a reference pattern associated with a particular valve event to detect a non-responsive cylinder/valve.

Those of ordinary skill in the art will recognize a number of advantages associated with various embodiments according to the present disclosure. For example, monitoring operation of valve deactivation using an existing camshaft sensor provides diagnostics and control without the necessity of an additional dedicated sensor. Systems and methods according to the present disclosure may be used for detecting various types of anomalous operation including valve operation (lifting) while deactivated as well as valves remaining closed after activation. Camshaft signal processing according to the present disclosure may be continuously performed rather than being triggered in response to a state or mode change. Monitoring of valve deactivation according to embodiments of the present disclosure may reduce or eliminate degradation in drivability, NVH (noise, vibration, harshness), fuel economy or component durability otherwise associated with valves or cylinders that do not respond as desired.

The above advantages and other advantages and features will be readily apparent from the following detailed description of the preferred embodiments when taken in connection with the accompanying drawings.

BRIEF DESCRIPTION OF THE DRAWINGS

FIGS. 8A-8D illustrate a surrogate signal or metric generated using pattern matching of camshaft sensor tooth signatures indicating delayed exhaust valve deactivation/activation events according to embodiments of the present disclosure.

DETAILED DESCRIPTION

As those of ordinary skill in the art will understand, various features of the embodiments illustrated and described with reference to any one of the Figures may be combined with features illustrated in one or more other Figures to produce alternative embodiments that are not explicitly illustrated or described. The combinations of features illustrated provide representative embodiments for typical applications. However, various combinations and modifications of the features consistent with the teachings of the present disclosure may be desired for particular applications or implementations. The representative embodiments used in the illustrations relate generally to a four-stroke, multi-cylinder, port injected internal combustion engine operable in a variable displacement mode with mechanically actuated intake and/or exhaust valves and an electronically controlled throttle valve. Those of ordinary skill in the art may recognize similar applications or implementations with other engine/vehicle technologies including direct injected and/or port injected engines, spark-ignition or compression ignition engines, and engines using different cylinder or valve deactivation technology including but not limited to mechanical, electromagnetic, electromechanical, and hydraulic systems that deactivate one or more cylinders or groups of cylinders, such as a bank of cylinders, by deactivating one or more associated intake and/or exhaust valves. Similarly, although the present disclosure is primarily directed to monitoring operation of exhaust valve deactivation or combined intake/exhaust valve deactivation, those of ordinary skill in the art may recognize that the teachings of the present disclosure may be modified for application to intake valve deactivation systems. Likewise, embodiments of the present disclosure may be used in engines having various types of valvetrains including overhead valvetrains (OHV), also referred to as type I valvetrains, as well as pushrod or cam-in-block valvetrains, also referred to as type II valvetrains.

Figure 1:
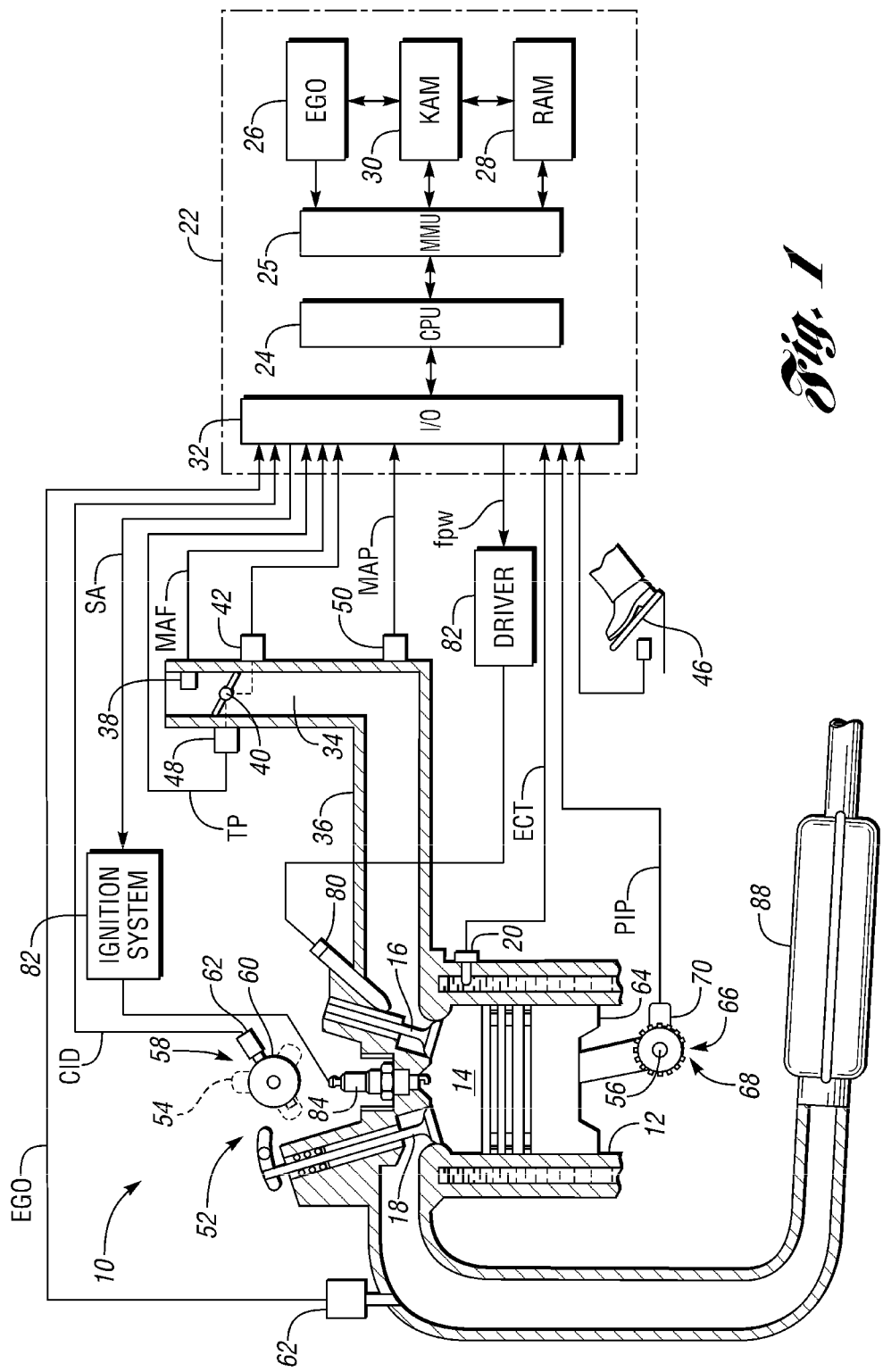
FIG. 1 is a block diagram illustrating operation of a representative engine/vehicle embodiment with valve deactivation monitoring using camshaft position sensing according to the present disclosure.

In the representative embodiment illustrated in FIG. 1, system 10 includes a vehicle (not specifically illustrated) powered by an internal combustion engine having a plurality of cylinders, represented by cylinder 12, with corresponding combustion chambers 14. As one of ordinary skill in the art will appreciate, system 10 includes various sensors and actuators to effect control of the engine/vehicle. One or more sensors or actuators may be provided for each cylinder 12, or a single sensor or actuator may be provided for the engine. For example, each cylinder 12 may include four gas exchange valves including two intake valves 16 and two exhaust valves 18, with only one of each shown in the Figure. However, the engine may include only a single engine coolant temperature sensor 20. In the embodiment illustrated in FIG. 1, the engine includes mechanically actuated intake valves 16 and exhaust valves 18 with a variable valve timing mechanism and valve deactivation mechanism (not shown) in communication with a microprocessor-based controller 22 to control valve opening and closing times and for selectively deactivating one or more cylinders by deactivating corresponding intake valves 16 and/or exhaust valves 18 to provide variable displacement operation. In one embodiment, cylinder deactivation includes deactivation of at least the exhaust valves 18 for a particular cylinder. Other embodiments may include selective deactivation of both intake and exhaust valves for a particular cylinder and/or deactivation of exhaust valves for a group of cylinders, such as a cylinder bank. Various other embodiments include alternative valve configurations and valve control using mechanical, electromechanical, hydraulic, and/or combination valve actuation, activation, and/or deactivation. For example, in one embodiment, intake valves 16 and exhaust valves 18 are actuated by an associated camshaft 54 and dual-equal variable cam timing mechanism (not shown). Alternatively, intake valves 16 and exhaust valves 18 may be conventionally actuated using a cam-in-block configuration with pushrods and rocker arms, with exhaust valves 18 having a mechanical and/or hydraulic deactivation mechanism generally known in the art.

In one embodiment, system 10 may be selectively operated in a variable displacement mode with fewer than all cylinders 12 participating in combustion by deactivating corresponding actuators for intake valves 16 and/or exhaust valves 18. Operation in a variable or reduced displacement mode is generally associated with higher manifold pressure and wider opening of throttle valve 40 to reduce pumping losses and increase efficiency of the activated or operating cylinders. Monitoring of valve lifting using position of camshaft 54 according to the present disclosure may be used to detect various types of operating conditions. For example, operating conditions where intake valves 16 and/or exhaust valves 18 continue to operate (lift) after valve deactivation is commanded may be detected in response to varying position of camshaft 54 as described in greater detail herein. Valves that continue to operate after a commanded deactivation may result in reduced fuel economy, increased oil consumption, and potential catalyst degradation or poisoning and may not be noticeable to the vehicle operator. As such, detection of this condition according to the present disclosure may be used to modify subsequent control of the engine, which may include inhibiting operation in the variable displacement mode, inhibiting deactivation of a particular cylinder or group of cylinders, storing a diagnostic code, and/or alerting the vehicle operator via an indicator light or diagnostic message, for example. Similarly, camshaft position may be used to detect valves that remain closed for one or more combustion cycles after a reactivation command.

Controller 22 may include a microprocessor 24 or central processing unit (CPU), in communication with a memory management unit (MMU) 25. MMU 25 controls movement of data among various computer readable storage media and communicates data to and from CPU 24. Computer readable storage media may include volatile and nonvolatile storage in read-only memory (ROM) 26, random-access memory (RAM) 28, and keep-alive memory (KAM) 30, for example. KAM 30 is a persistent or non-volatile memory that may be used to store various operating variables while CPU 24 is powered down. Computer-readable storage media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by CPU 24 in controlling the engine or vehicle into which the engine is mounted. Computer-readable storage media may also include floppy disks, CD-ROMs, hard disks, and the like.

CPU 24 communicates with various engine/vehicle sensors and actuators via an input/output (I/O) interface 32. Interface 32 may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to CPU 24. Examples of parameters, systems, and/or components that may be directly or indirectly actuated under control of CPU 24, through I/O interface 32, are fuel injection timing, rate, and duration, throttle valve position, spark plug ignition timing (for spark-ignition engines), intake/exhaust valve timing and duration (or cam phasing), front-end accessory drive (FEAD) components such as an alternator, air conditioning compressor, and the like. Sensors communicating input through I/O interface 32 may be used to indicate crankshaft position (PIP), engine rotational speed (RPM), wheel speed (WS1, WS2), vehicle speed (VSS), coolant temperature (ECT), intake manifold pressure (MAP), exhaust back pressure (EBP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear or ratio (PRN), transmission oil temperature (TOT), transmission turbine speed (TS), torque converter clutch status (TCC), deceleration or shift mode (MDE), for example.

Some controller architectures do not contain an MMU 25. If no MMU 25 is employed, CPU 24 manages data and connects directly to ROM 26, RAM 28, and KAM 30. Of course, more than one CPU 24 may be used to provide engine control and controller 22 may contain multiple ROM 26, RAM 28, and KAM 30 coupled to MMU 25 or CPU 24 depending upon the particular application.

In operation, inducted air passes through intake 34 and is distributed to the plurality of cylinders 12 via an intake manifold, indicated generally by reference numeral 36. System 10 may include a mass airflow sensor 38, or other airflow sensor, that provides a corresponding signal (MAF) to controller 22 indicative of the intake or induction airflow. A throttle valve 40 or other airflow control device may be used to modulate the airflow and control manifold pressure in intake 36 to control engine torque to a desired output torque in cooperation with ignition timing and fuel control, particularly for spark-ignition engines. Throttle valve 40 may be mechanically or electronically controlled by an appropriate actuator 48 based on a corresponding throttle position (TP) signal generated by controller 22. The throttle position (TP) signal may be generated to position the throttle in response to a corresponding engine output or torque requested by an operator via accelerator pedal 46. A throttle position sensor 42 provides a feedback signal to controller 22 indicative of the actual position of throttle valve 40 to implement closed loop control of throttle valve 40. Although the embodiment illustrated in FIG. 1 is a spark-ignited port injected engine, the system and method for monitoring valve operation according to the present disclosure are generally independent of the engine technology and apply to direct injection and/or compression ignition engines or modes of operation.

A manifold absolute pressure sensor 50 is used to provide a signal (MAP) indicative of the manifold pressure to controller 22. Air passing through intake manifold 36 enters combustion chamber 14 through appropriate control of one or more intake valves 16. Timing, activation, and deactivation of intake valves 16 and exhaust valves 18 may be controlled by controller 22 using associated variable valve timing (VVT) or variable cam timing (VCT) devices depending on the particular application and implementation. Intake valves 16 and/or exhaust valves 18 for associated cylinders may be selectively activated and deactivated in response to a control signal from controller 22 using any of a number of electrical, mechanical, electromechanical, and/or hydraulic valve actuation mechanisms as generally known in the art. Cylinder (or valve) deactivation may be controlled in response to engine and/or ambient operating conditions to achieve desired engine and/or vehicle performance, fuel economy, and emissions goals, for example. Depending on the particular implementation, deactivation may be controlled by individual cylinders, individual valves, groups of cylinders, or type of valves. For example, exhaust valves for an entire cylinder bank may be deactivated under low engine speed and light load conditions after reaching a suitable operating temperature.

A fuel injector 80 injects an appropriate quantity of fuel into activated cylinders in one or more injection events for the current operating mode based on a signal (FPW) generated by controller 22 and processed by driver 82. At the appropriate time during the combustion cycle, controller 22 generates a spark signal (SA) that is processed by ignition system 82 to control spark plug 84 and initiate combustion within chamber 14.

As previously described, intake valves 16 and/or exhaust valves 18 may be controlled using a conventional camshaft arrangement, indicated generally by reference numeral 52. Camshaft arrangement 52 includes a camshaft 54 that completes one revolution per combustion or engine cycle, which requires two revolutions of crankshaft 56, such that camshaft 54 rotates at half the speed of crankshaft 56. Rotation of camshaft 54 (in cooperation with controller 22 in a variable cam timing or camless engine application) controls one or more activated exhaust valves 18 to exhaust the combusted air/fuel mixture through an exhaust manifold. A camshaft position sensor 58 provides a signal indicative of rotational position of camshaft 54, and may provide a cylinder identification (CID) signal associated with one tooth of sensor wheel 60 once each revolution of camshaft 54 or equivalently once each combustion cycle. In one embodiment, camshaft position sensor 58 includes a sensor wheel 60 that includes five (5) teeth including four teeth generally equally spaced and a fifth tooth to provide the CID indication. Other embodiments may include a sensor wheel 60 that includes seven teeth, or any other number of teeth arranged to provide a camshaft position signal that may be used to monitor valve operation according to the present disclosure. Sensor wheel 60 rotates with camshaft 54 with teeth detected by a Hall effect or variable reluctance sensor 62. Camshaft position sensor 58 may be used to identify with certainty the position of a designated piston 64 within cylinder 12. The particular cylinder number and piston position may vary depending upon the particular application and implementation.

Additional rotational position information for controlling the engine may be provided by a crankshaft position sensor 66 that includes a toothed wheel 68 and an associated sensor 70. In one embodiment, toothed wheel 68 includes thirty-five teeth equally spaced at ten-degree (10°) intervals with a single twenty-degree gap or space referred to as a missing tooth. In combination with camshaft position sensor 58, the missing tooth of crankshaft position sensor 66 may be used to generate a signal (PIP) used by controller 22 for fuel injection and ignition timing, for example. In one embodiment, a dedicated integrated circuit chip within controller 22 is used to condition/process the raw rotational position signal generated by position sensor 66 and outputs a signal (PIP) once per cylinder per combustion cycle, i.e. for an eight-cylinder engine, eight PIP signals per combustion cycle are generated for use by the control logic. Depending upon the particular application, control logic within CPU 24 may have additional position information provided by sensor 66 to generate a PIP signal or equivalent, for example. Crankshaft position sensor 66 may also be used to determine engine rotational speed and to identify cylinder combustion based on an absolute, relative, or differential engine rotation speed. Crankshaft position may be used in determining a position reference for position of camshaft 54 as indicated by sensor wheel 60 for use in monitoring valve operation according to the present disclosure.

Depending on the particular application, an exhaust gas oxygen sensor 62 may be used to provide a signal (EGO) to controller 22 indicative of whether the exhaust gasses are lean or rich of stoichiometry. Likewise, depending upon the particular application, sensor 62 may provide a two-state signal corresponding to a rich or lean condition, or alternatively a signal that is proportional to the stoichiometry of the exhaust gases. When provided, this signal may be used to adjust the air/fuel ratio, or control the operating mode of one or more cylinders, for example. The exhaust gas is passed through the exhaust manifold and one or more catalysts 88 before being exhausted to atmosphere.

Controller 22 includes software and/or hardware implementing control logic to monitor operation of intake valves 16 and/or exhaust valves 18 based on a camshaft signature or surrogate signal and to control the engine in response. When valve operation inconsistent with a current operating mode or state is detected, controller 22 may respond by storing a diagnostic code in computer readable storage media, activating a light, generating a message for the operator, and/or disabling subsequent valve/cylinder deactivation, for example. In one embodiment, multiple cylinder internal combustion engine 10 is operable in a reduced displacement mode with at least one valve or cylinder selectively deactivated. A camshaft sensor signal may be processed to detect valve operation inconsistent with a current valve/cylinder state, e.g. activated or deactivated. The camshaft position may be used to produce a surrogate signal indicative of intake/exhaust valve lift. The surrogate signal may be generated using camshaft sensor tooth deviation relative to an expected or reference tooth position for a corresponding crankshaft position and compared to a corresponding threshold to detect intake/exhaust valve lift. In another embodiment, the surrogate signal indicative of valve lift is generated by pattern matching of one or more reference tooth position patterns to a measured or inferred tooth position pattern. In this embodiment the surrogate signal represents a correlation, probability, or degree of match to a reference pattern associated with a particular valve event to detect a non-responsive cylinder/valve.

When the camshaft or surrogate signal indicates valve operation inconsistent with the expected or commanded operating mode, controller 22 may attempt various remedial measures. For example, controller may selectively reactivate the cylinder(s) and/or exhaust valve(s) that were previously deactivated to determine whether the valve opening condition during deactivation is repeated. The controller may attempt multiple activation/deactivation cycles of the identified cylinder(s) or valve(s), and/or initiate various other diagnostic tests or remedial actions depending upon the particular application. Controller 22 may also store a temporary or persistent diagnostic code in computer readable media 28, 30 and/or illuminate a diagnostic light or message to alert an operator. Subsequent deactivation of one or more cylinders or valves may be inhibited until the diagnostic code is cleared or subsequent monitoring indicates the suspect exhaust valves or cylinders are operating as expected. Of course, the particular actions initiated or performed by controller 22 in response to detecting valve openings during deactivation may vary depending upon the particular application and implementation.

As previously described, under certain engine and/or ambient operating conditions, controller 22 may operate the engine in a reduced or variable displacement mode with one or more cylinders 12 being deactivated. Depending on the particular application, cylinder deactivation may include deactivating intake valves 16 and/or exhaust valves 18 using corresponding valve actuators. However, the present disclosure is independent of the particular type of valve actuation and/or activation/deactivation mechanism. In one embodiment, both intake valves 16 and exhaust valves 18 are deactivated for an entire cylinder bank of a "V" engine using a mechanical/hydraulic deactivation system when operating in a reduced displacement mode. The present disclosure recognizes that the presence or absence of valve impact events and torsionals from the cylinders during activation and deactivation, respectively, results in slight deviations of the sensed angle of the camshaft and associated cam position sensor wheel teeth during specific crankshaft positions. Intake valve operation may be more difficult to detect than exhaust valve operation. However, various techniques consistent with the teachings of the present disclosure have been used to monitor exhaust valves and should also be capable of monitoring intake valve operation with additional refinements consistent with the teachings of the present disclosure.

Figure 2:
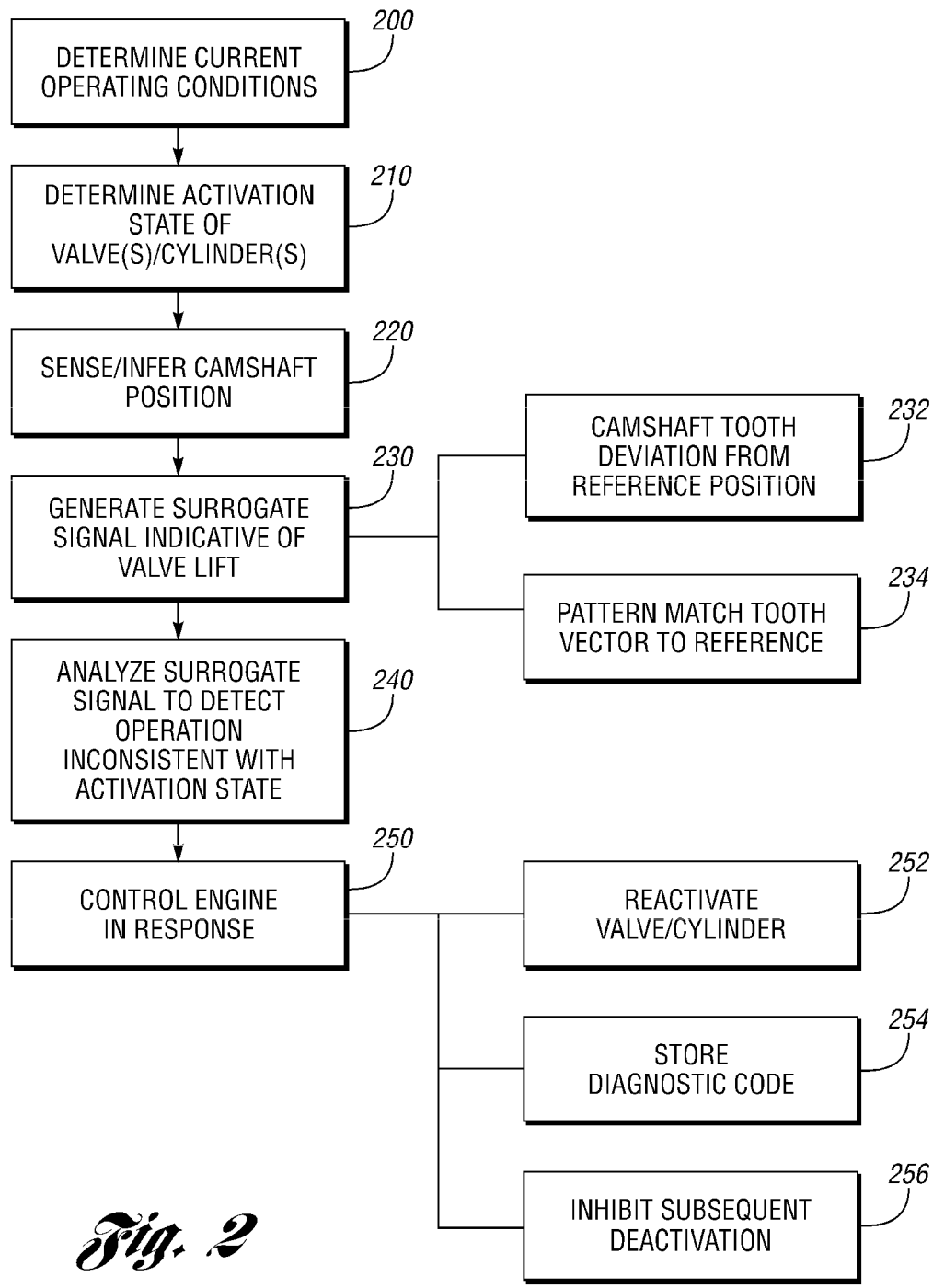
FIG. 2 is diagram illustrating operation of a system or method for monitoring valve operation and controlling an engine based on camshaft position according to embodiments of the present disclosure.
Figure 4:
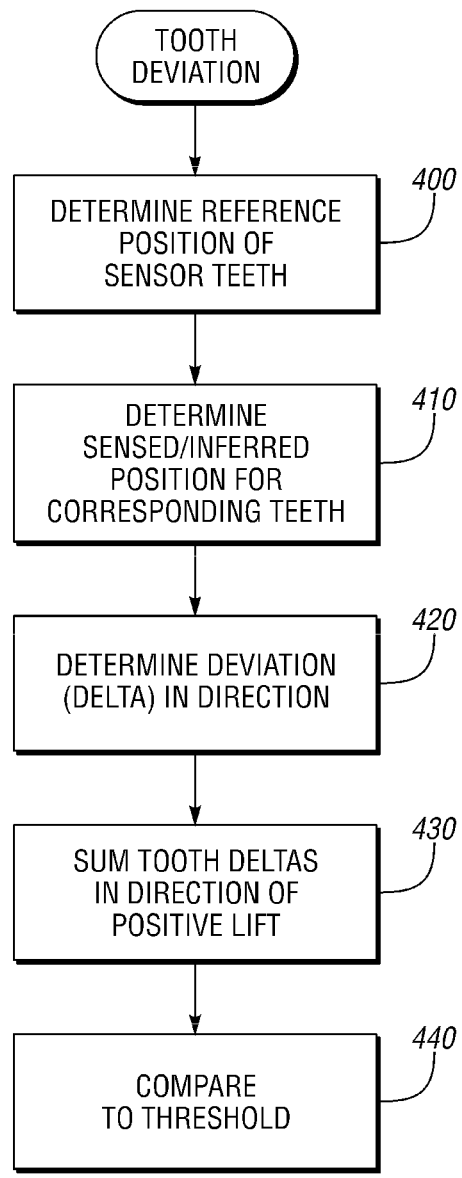
FIG. 4 is a flow chart illustrating a tooth deviation strategy for generating a surrogate signal indicative of valve lift for monitoring valve operation according to embodiments of the present disclosure.
Figure 6:
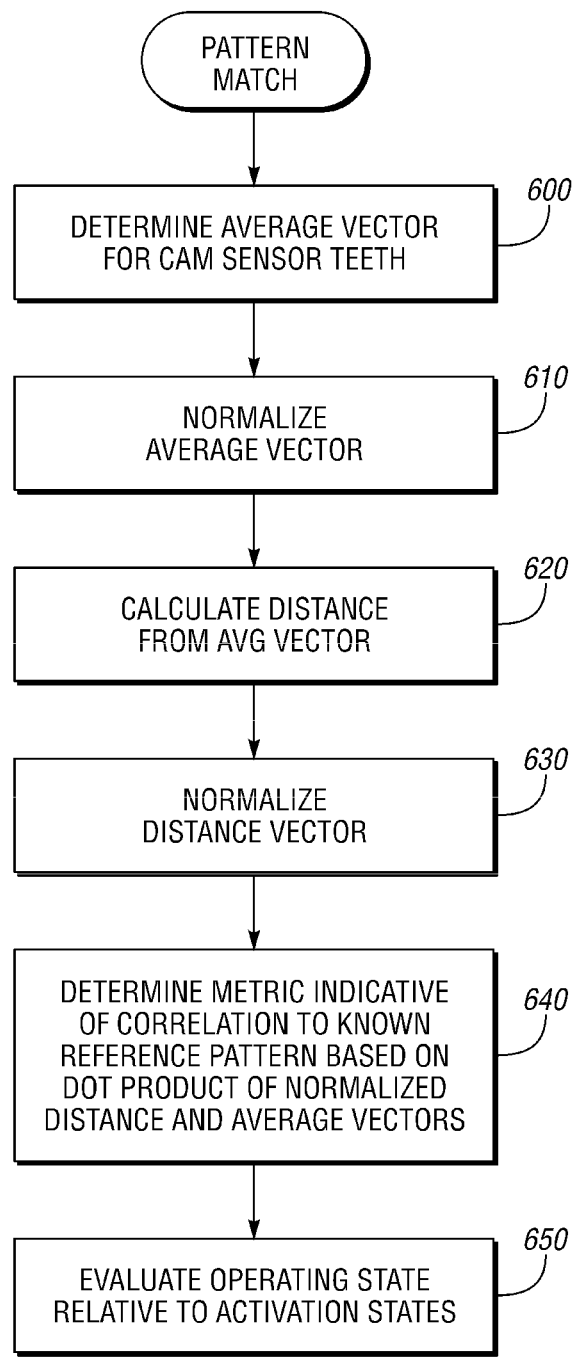
FIG. 6 is a flow chart illustrating a pattern matching strategy for generating a surrogate signal indicative of valve lift for monitoring valve operation according to embodiments of the present disclosure.

FIG. 2 is diagram illustrating operation of a system or method for monitoring valve operation and controlling an engine based on camshaft position according to embodiments of the present disclosure. The diagrams of FIGS. 2, 4, and 6 provide representative control strategies for an internal combustion engine to monitor operation of intake/exhaust valves to detect operation inconsistent with a corresponding operating mode or state, such as an activated or deactivated state, for example. The control strategies and/or logic illustrated in the figures represents any of a number of known processing strategies such as event-driven, interrupt-driven, multi-tasking, multi-threading, and the like. As such, various steps or functions illustrated may be performed in the sequence illustrated, in parallel, or in some cases omitted. Although not explicitly illustrated, one of ordinary skill in the art will recognize that one or more of the illustrated functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 22 (FIG. 1). Of course, the control logic may be implemented in software, hardware, or a combination of software and hardware in one or more controllers depending upon the particular application. When implemented in software, the control logic is preferably provided in one or more computer-readable storage media 26, 28, 30 (FIG. 1) having stored data representing code or instructions executed by a computer to control the engine. The computer-readable storage media may include one or more of a number of known physical devices which utilize electric, magnetic, and/or optical storage to keep executable instructions and associated calibration information, operating variables, and the like.

Current engine and/or ambient operating conditions are determined as represented by block 200. Such conditions may include current operating mode(s) (idle, cruise, start, shutdown, reduced displacement, etc.) in addition to engine, vehicle, and/or ambient conditions or parameters (temperature(s), pressure(s), speed(s), state accessory operation, etc.). Current engine and/or ambient operating conditions or modes may be used in determining whether operation in a reduced displacement mode is desirable to meet vehicle performance, fuel economy, and emissions goals, for example. As previously described, cylinder deactivation may include deactivation of intake valves, exhaust valves, or both for one or more cylinders. However, the present disclosure is independent of the number or type of gas exchange valves (intake and/or exhaust) that may be activated or deactivated to provide various operating modes, such as one or more reduced displacement operating modes, for example. In one embodiment, intake and exhaust valves are deactivated for all cylinders on a single cylinder bank when operating in reduced displacement mode. The current activation state of one or more valves and/or cylinders is determined as represented by block 210.

Current camshaft position is detected as represented by block 220 using any of a number of known strategies. In the embodiment of FIG. 1, a camshaft is coupled to a multiple tooth sensor wheel with position detected based on the leading and/or trailing edge of each sensor tooth. The number and position of the sensor wheel teeth may vary depending on the particular application. The camshaft position may be specified relative to a reference, such as a crankshaft angular position, for example. In some embodiments, camshaft position can be inferred rather than directly measured from one or more related sensors.

A surrogate signal indicative of valve lift is generated based on the camshaft position data as represented by block 230. Various strategies may be used to generate such a surrogate signal. The present disclosure uses the disturbance in camshaft timing from an expected reference timing (either earlier or later) for the various sensor teeth recognizing that the reactive force of the valve spring and rocker arm do not apply force in the same manner on the camshaft or operating and non-operating valves. Various techniques may be used to detect these disturbances, such as by analyzing tooth position of specific teeth or a tooth pattern or signature formed by the positions of adjacent teeth relative to reference positions as represented by blocks 232 and 234, respectively. The surrogate signal is analyzed to detect whether the corresponding valve is operating and then compared to a current operating mode or state, such as activated or deactivated, to determine whether the operation is consistent or inconsistent with the valve/cylinder activation state as represented by block 240. The engine is then controlled in response to the determination as represented in block 250. Various diagnostic and control functions may be executed if the valve operating state is inconsistent with the activation state as represented generally by block 250. For example, one or more valves or cylinders may be repeatedly activated or deactivated are represented by block 252. Alternatively, or in combination, one or more diagnostic codes may be stored in volatile or persistent memory as represented by block 254. Likewise, subsequent deactivation of one or more valves or cylinders may be inhibited or prevented as represented by block 256.

Figure 3:
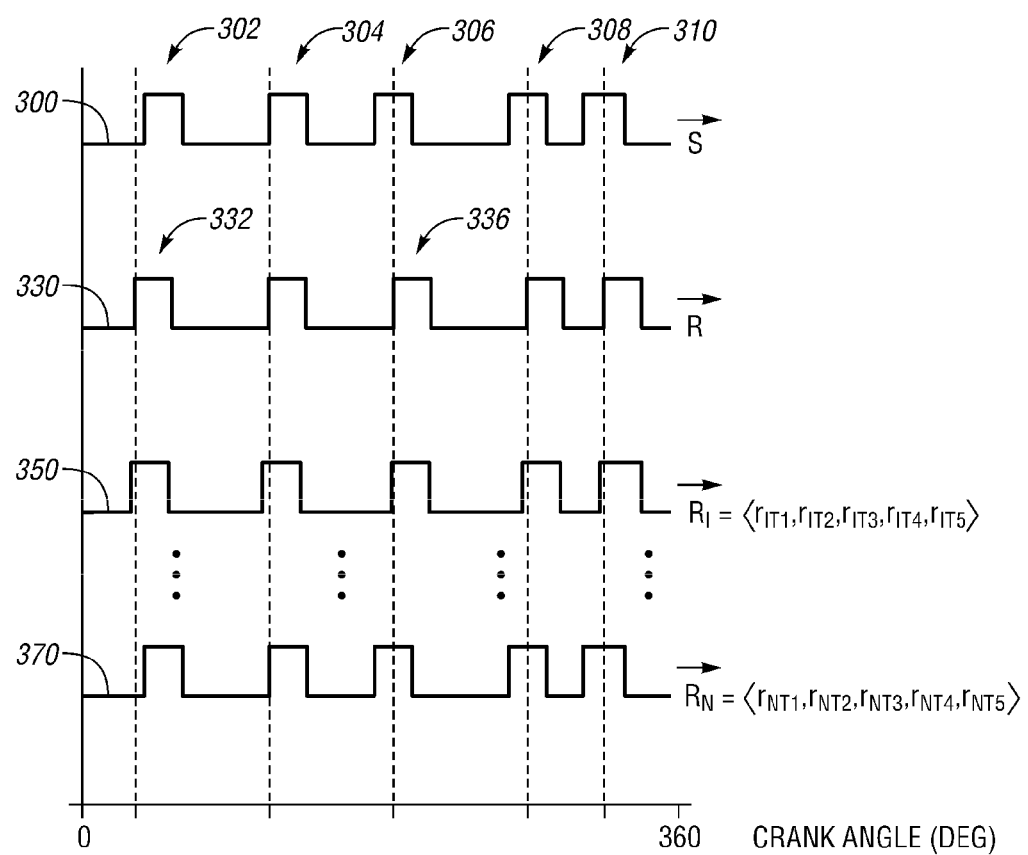
FIG. 3 is a diagram illustrating camshaft sensor tooth position relative to crankshaft position for a sensed or inferred camshaft signal and various reference positions for use in determining a surrogate signal indicative of current operation relative to known operating states according to embodiments of the present disclosure.

FIG. 3 is a diagram illustrating camshaft sensor tooth position relative to crankshaft position for a sensed or inferred camshaft signal and various reference positions for use in determining a surrogate signal indicative of current operation relative to known operating states according to embodiments of the present disclosure. Signal 300 represents a camshaft position signal that may be sensed by a corresponding multi-toothed sensor wheel having five teeth in this example with each tooth generating a corresponding pulse 302, 304, 306, 308, and 310. A similar signal may be generated for each camshaft on engines having multiple camshaft arrangements. Likewise, separate signals may be generated for an intake valve camshaft and exhaust valve camshaft, for example. Each tooth pulse 302-310 may be specified relative to crankshaft position as measured in crank angle degrees, for example. One or more of the measured or inferred tooth positions as indicated by pulses 302-310 may be compared to a reference position of a corresponding tooth as represented by reference signal 330. The reference tooth positions represented by reference signal 330 may be determined based on respective average positions for each tooth over a number of combustion cycles corresponding to a known operating state of valves associated with a particular cylinder. The reference values represented by line 330 may be determined during engine development or calibration and stored in non-volatile memory and do not necessarily correspond to an actual reference signal generated during operation of the engine, but are provided to illustrate sensor tooth deviations or disturbances relative to an expected value. Similarly, a plurality of reference vectors or tooth patterns (position values of adjacent teeth over one camshaft revolution) represented by lines 350 and 360 may be stored in persistent memory in corresponding look-up tables and used for pattern matching as described in greater detail herein.

As shown in FIG. 3, camshaft position corresponding to tooth position 302 is shifted or deviated relative to reference position 332 in a first direction while position of tooth or pulse 306 is shifted in the opposite direction relative to reference position 336. This relative timing may sometimes be referred to as being later or earlier, respectively, than expected based on an average value corresponding to a know operating state, such as all valves operating, or one bank deactivated, for example. The tooth position deviation of signal 300 relative to one or more reference values represented by line 300 may be used to generate a surrogate signal indicative of valve lift and resulting operation consistent with, or inconsistent with, a current operating mode or activation state as illustrated and described with respect to FIGS. 4 and 5.

FIG. 4 is a flow chart illustrating a tooth deviation strategy for generating a surrogate signal indicative of valve lift for monitoring valve operation according to embodiments of the present disclosure. A reference position for each sensor tooth is determined as represented by block 400. As previously described, this may be a desired or theoretical value, an average value for the particular engine determined over previous combustion cycles when operating with a known operating valve state, or empirically determined during engine development and calibration, for example. Depending in the particular application, reference positions may be determined for a variety of operating modes or states including one or more variable displacement operating modes, for example. The sensed or inferred camshaft position is determined based on the position of corresponding sensor wheel teeth as represented by block 410 and signal 300 (FIG. 3). A deviation or delta is then determined for one or more teeth relative to one or more reference tooth positions as represented by block 420. The sum of tooth deltas or deviations in the direction of positive indicating lift for a given valve set (such as a particular cylinder bank and valve type) as represented by block 430 to generate a surrogate signal (FIG. 5) proportional to that valve set lifting or remaining closed. The surrogate signal may then be compared to an absolute threshold or a delta threshold representing a change in lift to detect an activation/deactivation event occurring when the signal or delta crosses the corresponding threshold, for example.

Figure 5A:
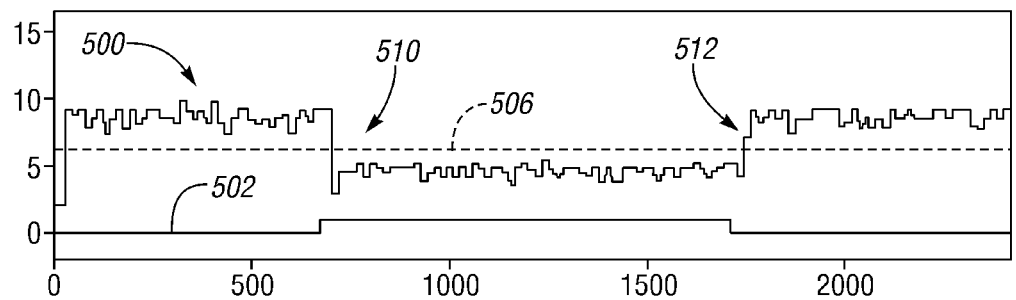
FIGS. 5A and 5B illustrate a representative surrogate signal for monitoring valve operation demonstrating normal operation and a delayed deactivation according to embodiments of the present disclosure.
Figure 5B:
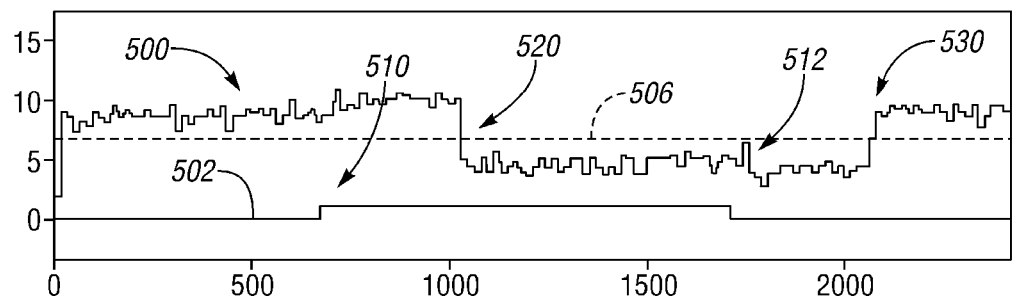

FIGS. 5A and 5B illustrate a representative surrogate signal for monitoring valve operation and determining operation consistent with activation or deactivation according to embodiments of the present disclosure.

FIG. 5A illustrates a surrogate signal 500 for a valve system demonstrating normal operation. Signal 500 (or equivalent values) is calculated based on the sum of camshaft sensor tooth deltas as described with respect to FIG. 4. A valve operating state or commanded state flag or signal generated by the engine controller in response to current operating conditions is represented by line 502. A valve deactivation command or signal is generated at 510 and surrogate signal 500 crosses a corresponding threshold 506 indicating that the valves have been deactivated and the engine is operating in a reduced displacement mode, i.e. gas exchange valve operation is determined to be consistent with the current operating mode or state. Similarly, a valve activation signal or command is generated by the controller at 512 and surrogate signal 500 crosses threshold 506 indicate the corresponding valves have been activated.

FIG. 5B illustrates a surrogate signal 500 for a valve system demonstrating delayed valve deactivation and subsequent activation such that valve operation is inconsistent with an activation stat of the associated cylinder(s) for a period of time during the commanded reduced displacement mode operation. As illustrated in FIG. 5B, a deactivation or reduced displacement mode is commanded by the engine controller at 510. However, surrogate signal 500 does not cross threshold 506 until some number of combustion cycles later indicating that valves continued to lift during the period between 510 and 520. Surrogate signal 500 remaining above threshold 506 during reduced displacement mode indicates valve operation inconsistent with the current commanded activation state. Similarly, reduced displacement mode is exited and corresponding cylinders re-activated at 512. However, surrogate signal 500 remains below corresponding threshold 506 indicative of valve operation inconsistent with the current command activation state until the valves begin operating some number of combustion cycles later at 530. As such, FIGS. 4 and 5, for example, illustrate a method for monitoring operation of selectively deactivated valves of the engine by comparing detected camshaft position to a corresponding reference camshaft position.

FIG. 6 is a flow chart illustrating a pattern matching strategy for generating a surrogate signal indicative of valve lift for monitoring valve operation of selectively deactivated gas exchange valves according to embodiments of the present disclosure. In this embodiment, the surrogate signal is a metric representing correlation of a tooth pattern or signature to one of a plurality of stored patterns or signatures. This strategy attempts to pattern match the tooth positions for each revolution to a normalized expected deviation of the teeth from the average for the revolution. This is then correlated to a valve set (cylinder bank and type of valve, for example) and the set that is most probable is selected as the valve state for that revolution. This valve state is then compared to the expected or commanded activation/deactivation state to determine whether valve operation is consistent/inconsistent with the activation state.

As represented by block 600 of FIG. 6, a tooth pattern is constructed by finding the average of all "n" teeth for the particular sensor wheel revolution. This pattern may be represented by an n-dimensional average vector having components or dimensions representing camshaft position (as referenced to crank angle degrees in this example) for each tooth for one revolution. The average vector representing the reference tooth pattern is normalized by dividing by its norm as represented by block 610. The distance of the sensed or measured tooth pattern represented by a signal vector from the average vector is determined as represented by block 620. This distance vector is then normalized by dividing it by its norm as represented by block 630. A dot product of the normalized distance vector and the normalized average vector is computed to determine a metric indicative of correlation of the sensed tooth pattern to a known or reference tooth pattern as represented by block 640. This metric has a value between −1, for negative correlation, and +1 for positive correlation with a continuum therebetween. Representative surrogate signals generated using this metric are illustrated and described with respect to FIGS. 7-9. The metric can be used to indicate whether a valve or group of valves is operating (lifting). The operating state is evaluated relative to the command activation state(s) as represented by block 650 to determine if the valve operation is consistent or inconsistent with the expected or commanded state.

FIGS. 7A-7D illustrate a surrogate signal or metric representing correlation or pattern matching of a camshaft sensor tooth pattern to a known or reference tooth pattern where current operation is consistent with valve activation/deactivation states according to embodiments of the present disclosure.

Figure 7A:
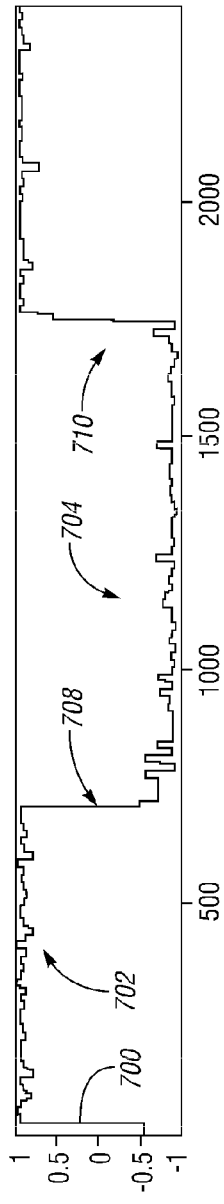
FIG. 7A-7D illustrate a surrogate signal or metric representing correlation or pattern matching of a camshaft sensor tooth pattern to a known or reference tooth pattern where current operation is consistent with valve activation/deactivation states according to embodiments of the present disclosure.

FIG. 7A corresponds to operation in a full displacement mode, which in one embodiment of a V-8 engine, includes eight cylinders. Surrogate signal 700 corresponds to all intake and exhaust valves operating as expected (activated) during period 702 with a correlation of +1 to the full displacement mode. A transition to reduced displacement or variable displacement mode is commanded at 708 and region 704 corresponds to an area of strong negative correlation with the metric having a value of −1. This represents operation of valves as intended or expected when operating in the reduced displacement mode, i.e. only four cylinders having operating valves in this example.

Figure 7B:
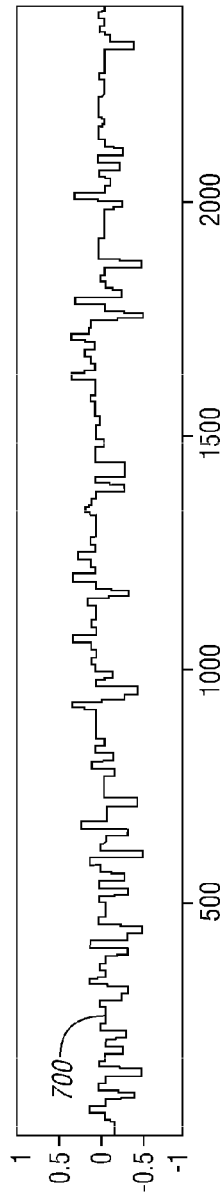
Figure 7C:
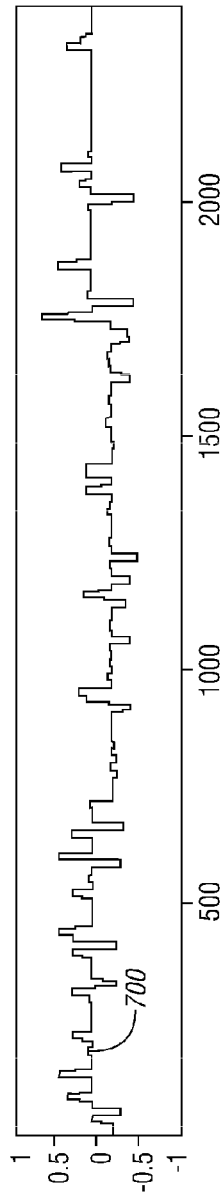
Figure 7D:
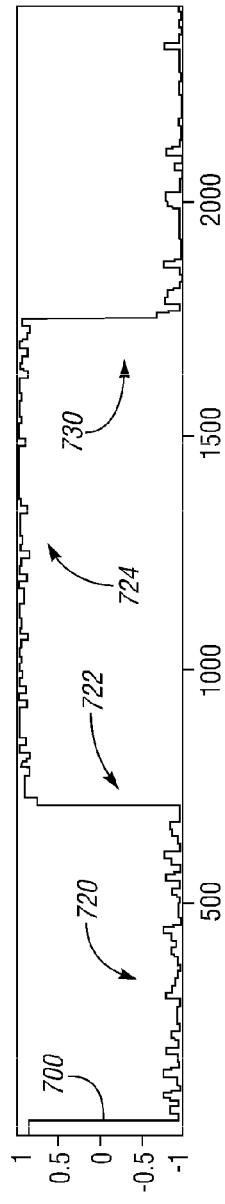

FIG. 7B illustrates surrogate signal 700 when only intake valves are operating or lifting. As shown, there is no strong positive or negative correlation with the V-8 mode or reduced displacement V-4 mode (FIG. 7D). Similarly, FIG. 7C illustrates surrogate signal 700 when only exhaust valves are operating or lifting. Again, there is no strong positive or negative correlation with the V-8 mode or the V-4 mode signals illustrated in FIG. 7A and FIG. 7D, respectively.

FIG. 7D illustrates surrogate signal 700 when both intake and exhaust valves are operating as expected during reduced displacement mode. The surrogate signal illustrated is complementary to the V-8 surrogate signal illustrated in FIG. 7A. As such, there is a strong negative correlation during period 720 because all valves are operating as expected for V-8 mode. At 722, signal 700 switches to a strong positive correlation consistent with the transition to reduced displacement mode during period 724, and returns to values indicating strong negative correlation at 730 consistent with the return to V-8 or full displacement mode.

FIGS. 8A-8D illustrate a surrogate signal or metric generated using pattern matching of camshaft sensor tooth signatures indicating delayed exhaust valve deactivation/activation events. Similar to FIGS. 7A-7D, FIG. 8A corresponds to a metric associated with expected valve behavior or operation in full displacement mode operation (all valves operating), while FIG. 8D corresponds to a metric associated with expected valve operation or behavior in a reduced displacement mode of operation (some valves/cylinders deactivated and the associated valves not lifting). FIG. 8B illustrates a metric associated with only intake valves lifting while FIG. 8C illustrates a metric with only exhaust valves lifting.

As illustrated in FIG. 8A, metric 800 corresponds to full displacement mode operation and has a value near +1 indicating a strong positive correlation during period 802 with all monitored valves operating as expected, i.e. all valves activated and lifting. Likewise, FIG. 8D illustrates a strong negative correlation to reduced displacement mode at 850 during this period. A reduced displacement mode is commanded at 804 with some cylinders/valves commanded to deactivate.

However, during period 806, metric 800 of FIG. 8A has values around zero indicating weak or poor correlation to the full displacement mode metric 800 represented in FIG. 8A, as well as a weak correlation to the reduced displacement mode metric 800 represented in FIG. 8D at 852. As indicated by the strong negative correlation to the metric representing only intake valves lifting at 830 in FIG. 8B, and the strong positive correlation to the metric representing only exhaust valves lifting at 840 in FIG. 8C, the exhaust valves continue to operate after the commanded deactivation such that the operation of the valves is inconsistent with the activation mode. This continues for a number of combustion cycles until the exhaust valves stop lifting at 808 and the metric 800 associated with the four operating conditions illustrated in FIGS. 8A-8D responds accordingly as illustrated during regions 810, 832, 842, and 854, respectively. Likewise, a re-activation is commanded at 812 but the exhaust valves do not respond until region 816, which is reflected by regions 814, 834, 844, and 856, respectively. During this period, the valve operation is inconsistent with the activation state because the exhaust valves should again be lifting but are not. Valve operation consistent with the activation state is then resumed as illustrated by regions 816, 836, 846, and 858 of FIGS. 8A-8D, respectively.

Figure 9A:
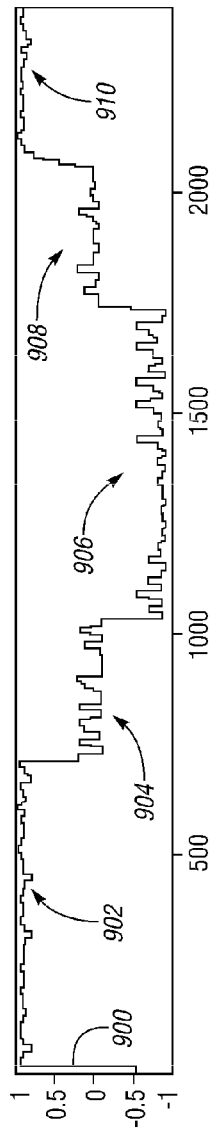
FIGS. 9A-9D illustrate a surrogate signal or metric generated using pattern matching of camshaft sensor tooth signatures indicating delayed intake valve deactivation/activation events according to embodiments of the present disclosure.
Figure 9B:
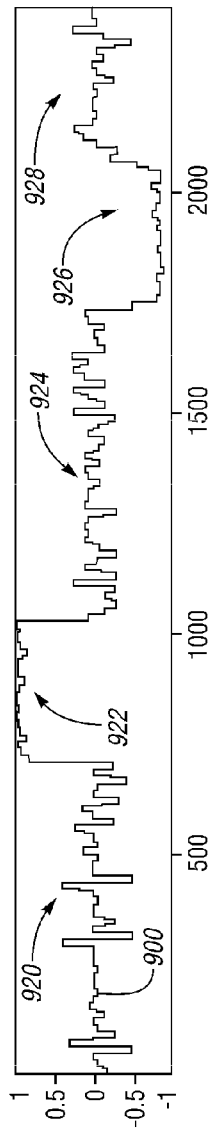
Figure 9C:
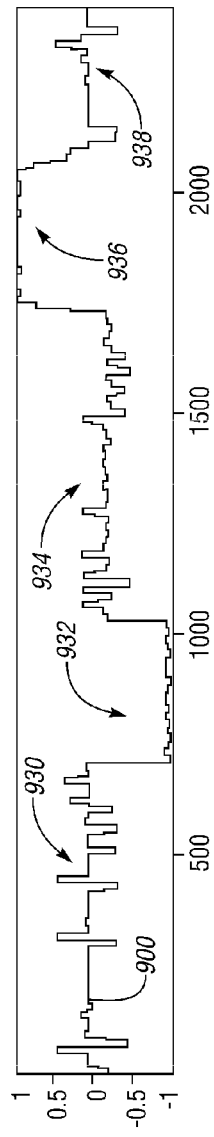
Figure 9D:
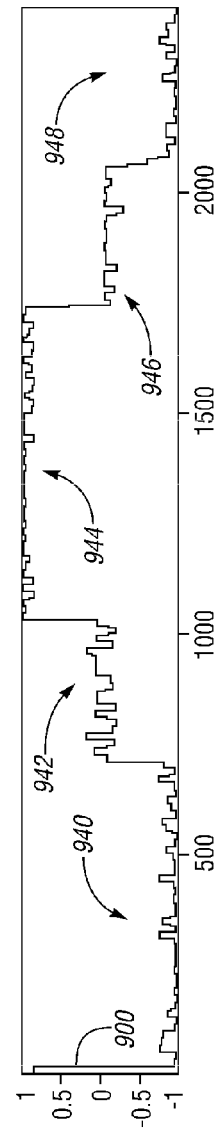

FIGS. 9A-9D illustrate a surrogate signal or metric generated using pattern matching of camshaft sensor tooth signatures indicating delayed intake valve deactivation/activation events according to embodiments of the present disclosure. Similar to the metric or signals illustrated in FIGS. 7 and 8, FIG. 9A corresponds to a metric 900 associated with expected valve behavior or operation in full displacement mode operation (all valves operating), while FIG. 9D corresponds to a metric associated with expected valve operation or behavior in a reduced displacement mode of operation (some valves/cylinders deactivated and the associated valves not lifting). FIG. 9B illustrates a metric associated with only intake valves lifting and FIG. 9C illustrates a metric with only exhaust valves lifting. Regions 902, 920, 930, and 940 illustrate the correlation of metric 900 to the possible operating modes while all valves are operating consistent with the current activation state, which is full displacement mode. Regions 904, 922, 932, and 942 illustrate operation after a command to deactivate some valves/cylinders for operation in a reduced displacement mode. The weak or poor correlation of FIGS. 9A and 9D demonstrate valve operation inconsistent with the commanded operation mode. The strong positive correlation of FIG. 9B and strong negative correlation of FIG. 9C indicate that the intake valves continued to operate (lift) after the deactivation command. Likewise, regions 906, 924, 934, and 944 represent valve operation consistent with the activation state during the reduced displacement mode as indicated by the strong positive correlation of FIG. 9A, strong negative correlation of FIG. 9D, and weak correlation of FIGS. 9B and 9C.

After a re-activation command, regions 908, 926, 936, and 946 indicate valve operation inconsistent with the current activation state as demonstrated by the strong positive correlation at 936 and strong negative correlation at 926, as well as the weak correlation at 908 and 946. Strong positive correlation at 936 indicates intake valves remaining closed after being commanded to re-activate. Regions 910, 928, 938, and 948 indicate valve operation consistent with activation state based on the strong positive correlation at 910, strong negative correlation at 948, and weak correlations at 928 and 938.

Those of ordinary skill in the art will recognize that various other patterns may be stored corresponding to one or more operating conditions other than those illustrated with only intake valves operating or only exhaust valves operation.

As such, embodiments according to the present disclosure provide a system and method for monitoring valve operation of selectively deactivated gas exchange valves of an internal combustion engine and controlling the engine in response to operation inconsistent with a current activation mode. Use of an existing camshaft position sensor to generate a surrogate signal or metric facilitates resulting diagnostics and control without the cost and complexity of an additional dedicated sensor. Systems and methods according to the present disclosure may be used for detecting various types of anomalous operation including valve operation (lifting) while deactivated as well as activated valves remaining closed and not lifting. Camshaft signal processing according to the present disclosure may be continuously performed rather than being triggered in response to a state or mode change. Monitoring of valve operation according to embodiments of the present disclosure may reduce or eliminate degradation in drivability, NVH (noise, vibration, harshness), fuel economy or component durability otherwise associated with valves or cylinders that do not operate as desired.

While one or more embodiments have been illustrated and described, it is not intended that these embodiments illustrate and describe all possible embodiments within the scope of the claims. Rather, the words used in the specification are words of description rather than limitation, and various changes may be made without departing from the spirit and scope of the disclosure. While various embodiments may have been described as providing advantages or being preferred over other embodiments or prior art implementations with respect to one or more desired characteristics, one or more features or characteristics may be compromised to achieve desired overall system attributes, which depend on the specific application and implementation. These attributes include, but are not limited to: cost, strength, durability, life cycle cost, marketability, appearance, packaging, size, serviceability, weight, manufacturability, ease of assembly, etc. The embodiments discussed herein that are described as less desirable than other embodiments or prior art implementations with respect to one or more characteristics are not outside the scope of the disclosure and may be desirable for particular applications.

What is claimed is:

1. A storage medium having computer executable instructions to monitor operation of at least one selectively deactivated gas exchange valve of at least one cylinder of an engine, comprising:
    instructions for controlling the engine in response to camshaft position relative to a reference camshaft position associated with a known cylinder activation state; and
    instructions for inhibiting subsequent deactivation of at least one cylinder in response to detecting operation inconsistent with an associated cylinder activation state.

2. The storage medium of claim 1 wherein the instructions for controlling comprise instructions for determining a metric indicative of correlation between a pattern having a plurality of camshaft positions at selected crankshaft positions to a corresponding reference pattern.

3. The storage medium of claim 1 wherein the instructions for controlling comprise instructions for determining a surrogate signal indicative of correlation between a camshaft signature and one of a plurality of reference camshaft signatures each associated with a known combination of gas exchange valve operating states.

4. A computer readable storage medium, comprising:
    instructions for detecting operation of a gas exchange valve inconsistent with an activation state of an associated cylinder during reduced displacement operation based on correlation of a detected pattern of camshaft tooth positions with a reference pattern for known gas exchange valve operating states; and instructions for inhibiting subsequent operation in reduced displacement mode when operation of the valve is inconsistent with the activation state of the associated cylinder.

5. The computer readable storage medium of claim 4 further comprising instructions for generating a surrogate signal indicative of gas exchange valve lift based on detected camshaft position.

6. The computer readable storage medium of claim 4 further comprising:

instructions for generating a surrogate signal indicative of gas exchange valve lift using camshaft sensor tooth deviation relative to a reference tooth position for a corresponding crankshaft position; and instructions for comparing the surrogate signal to a corresponding threshold to detect gas exchange valve lift.

7. The computer readable storage medium of claim 6 wherein the reference tooth position corresponds to an average crank angle value for a corresponding camshaft sensor tooth of an associated activated cylinder over multiple combustion cycles.

8. The computer readable storage medium of claim 4 further comprising:

instructions for generating a surrogate signal indicative of gas exchange valve lift representing the correlation of the detected pattern of camshaft tooth positions with one of a plurality of reference tooth position patterns.

9. The computer readable storage medium of claim 8 wherein the instructions for generating a surrogate signal comprise:

instructions for constructing a tooth pattern by determining an average vector having components representing average crank angle position of each camshaft sensor tooth for one camshaft revolution;

instructions for determining a normalized average vector by dividing the average vector by its norm;

instructions for calculating a distance vector having components representing distance of detected crank angle position from a corresponding reference crank angle position for each camshaft sensor tooth;

instructions for determining a normalized distance vector by dividing the distance vector by its norm; and instructions for dotting the normalized distance vector with a normalized average deviation vector to determine the correlation between the detected tooth position pattern and the reference pattern.

10. The computer readable storage medium of claim 4 wherein each of a plurality of reference tooth position patterns corresponds to an average crank angle value for each of a plurality of camshaft sensor teeth for activated cylinders over multiple combustion cycles.

11. The computer readable storage medium of claim 4 further comprising instructions for storing a diagnostic code in response to detecting operation of the gas exchange valve inconsistent with the activation state of the associated cylinder.

12. An engine controller memory, comprising:

code that detects operation of a gas exchange valve inconsistent with an activation state of an associated cylinder during reduced displacement operation using correlation of camshaft tooth positions with a reference pattern for known gas exchange valve operating states; and code that reactivates at least one deactivated cylinder in response to detecting operation of the gas exchange valve inconsistent with the activation state of the associated cylinder.

13. An engine controller memory for an engine having a selectively deactivated gas exchange valve operable by a camshaft, and a plurality of pistons coupled to a crankshaft, comprising:

instructions for controlling the engine in response to correlation of a detected pattern of camshaft tooth positions with one of a plurality of reference tooth position patterns indicative of gas exchange valve operation inconsistent with a cylinder activation state and inhibiting subsequent operation in reduced displacement mode in response to detecting operation of the valves inconsistent with the activation state of an associated cylinder.

14. The memory of claim 13 further comprising instructions for determining operation inconsistent with the cylinder activation state by comparing camshaft tooth position of a selected tooth to a reference tooth position associated with a known cylinder activation state.

15. The memory of claim 13 further comprising instructions for determining operation inconsistent with the cylinder activation state by comparing the detected pattern of camshaft tooth positions corresponding to one camshaft revolution to one of the reference tooth position patterns associated with a known cylinder activation state.

16. The memory of claim 13 further comprising instructions for determining a metric indicative of correlation of the detected pattern of camshaft tooth positions with one of the reference tooth position patterns each associated with a unique combination of known gas exchange valve operating states.

17. The memory of claim 13 further comprising instructions for storing a diagnostic code in response to determining operation inconsistent with the cylinder activation state.

* * * * *